United States Patent
Diachina et al.

(10) Patent No.: US 8,837,392 B2
(45) Date of Patent: Sep. 16, 2014

(54) APPLICATION LAYER COMMUNICATION VIA SINGLE RADIO BLOCK ACCESS

(75) Inventors: John Diachina, Garner, NC (US); Paul Schliwa-Bertling, Ljungsbro (SE); Andreas Bergström, Vikingstad (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 670 days.

(21) Appl. No.: 13/073,993

(22) Filed: Mar. 28, 2011

(65) Prior Publication Data
US 2011/0274058 A1 Nov. 10, 2011

Related U.S. Application Data

(60) Provisional application No. 61/332,932, filed on May 10, 2010.

(51) Int. Cl.
*H04W 72/04* (2009.01)
*H04W 4/00* (2009.01)
*H04L 29/08* (2006.01)

(52) U.S. Cl.
CPC .............. *H04W 4/00* (2013.01); *H04W 72/048* (2013.01); *H04W 4/005* (2013.01); *H04L 67/12* (2013.01)
USPC ............................ 370/329; 370/341; 370/322

(58) Field of Classification Search
USPC .......................................... 370/329, 352, 345
See application file for complete search history.

(56) References Cited

U.S. PATENT DOCUMENTS

| 6,870,858 | B1 * | 3/2005 | Sebire ........................... 370/514 |
| 7,450,560 | B1 * | 11/2008 | Grabelsky et al. ............ 370/352 |
| 2005/0111430 | A1 * | 5/2005 | Spear et al. ................... 370/345 |
| 2007/0028001 | A1 * | 2/2007 | Phillips et al. ................ 709/238 |
| 2010/0261491 | A1 * | 10/2010 | Alanara et al. ................ 455/466 |

OTHER PUBLICATIONS

Telefon AB LM Ericsson et al: "MTC Device Single Block Packet Access", 3GPP Draft; GP-100889—MTC Device Single Block Packet Access, 3rd Generation Partnership Project (3GPP), Mobile Competence Centre ; 650, Route Des Lucioles ; F-06921 Sophia-antipolis Cedex; France, vol. TSG Geran, No. Jeju; 20100517, May 12, 2010, XP050417124.

(Continued)

*Primary Examiner* — Dang Ton
*Assistant Examiner* — Pamit Kaur (57) ABSTRACT

Embodiments herein advantageously reduce the amount of control signalling and header information that must accompany an application layer message when transporting that message from a wireless device to a supporting application server via an intermediate node. To do so, the wireless device prepares a single radio block that includes the application layer message and an indication that the single radio block contains the entire application layer message. The device then sends a control message to the intermediate node that requests allocation of radio resources for sending the single radio block without establishing a temporary block flow (TBF). The device finally sends the single radio block using the allocated resources, without a TBF. Upon receiving the block, the intermediate node determines, based on the indication within the block, whether or not the block contains an entire application layer message. If so, the intermediate node forwards that application layer message towards the application server.

32 Claims, 8 Drawing Sheets

(56) References Cited

OTHER PUBLICATIONS

Telefon AB LM Ericsson et al: "MTC Device Activation Procedure", 3GPP Draft; GP-100885—MTC Device Activation Procedure, 3rd Generation Partnership Project (3GPP), Mobile Competence Centre ; 650, Route Des Lucioles ; F-06921 Sophia-Antipolis Cedex; France, vol. TSG Geran, No. Jeju; 20100517, May 12, 2010, XP050417121.

Telefon AB LM Ericsson et al: "MTC Device Priority Access", 3GPP Draft; GP-100891 MTC_Device_Priority_Access, 3rd Generation Partnership Project (3GPP), Mobile Competence Centre ; 650, Route Des Lucioles ; F-06921 Sophia-Antipolis Cedex; France, vol. TSG Geran, No. Jeju; 20100517, May 12, 2010.

* cited by examiner

< EGPRS Packet channel request message content > ::=
< Single Block Access Request Without TBF Establishment : 111    < RandomBits : bit (8) > >;

*FIG. 5A*

< EGPRS Packet channel request message content > ::=
< Single Block Access Request Without TBF Establishment : 111    < Priority : bit (1) >
< RandomBits : bit (7) > >;

*FIG. 5B*

< EGPRS Packet channel request message content > ::=
< Single Block Access Request Without TBF Establishment : 111    < Priority : bit (2) >
< RandomBits : bit (6) > >;

*FIG. 5C*

< EGPRS Packet channel request message content > ::=
  < Single Block Access Request Without TBF Establishment : 111
    < Priority : bit (2) >
    < RandomBits : bit (5) >
    < MTCAccess : bit (1) >>;

FIG. 5D

< EGPRS Packet channel request message content > ::=
  < MTC Access Request : 111
    < Priority : bit (2) >
    < RandomBits : bit (5) >
    < SingleBlockPA : bit (1) >>;

FIG. 5E

< EGPRS Packet channel request message content > ::=
  < MTC Access Request : 1110
    < Priority : bit (2) >
    < RandomBits : bit (5) >>;
  < MTC Single Block Access Request : 1111
    < Priority : bit (2) >
    < RandomBits : bit (5) >>;

APPLICATION LAYER COMMUNICATION VIA SINGLE RADIO BLOCK ACCESS

RELATED APPLICATION

This application claims priority from U.S. Provisional Patent App. No. 61/332,932 filed May 10, 2010, which is incorporated herein by reference in its entirety.

FIELD OF THE INVENTION

The present application generally relates to application layer communication, and particularly relates to sending application layer communications using single radio block access.

BACKGROUND

Wireless communications are extending beyond traditional mobile voice and data devices. Unlike these traditional devices, Machine Type Communication (MTC) devices wirelessly communicate with little or no human intervention. For example, an application on an MTC device may autonomously collect and send data to a supporting MTC server via a wireless communication network. This autonomous machine communication broadens the reach of useful wireless services to include smart utility metering, inventory control, remote patient care, and many others.

The anticipated introduction of a large number of MTC devices in the near future will place a large capacity demand on wireless communication networks. Indeed, it is expected that MTC devices will far outnumber traditional, non-MTC devices operated by human users. And, more problematic than the sheer increase in the number of devices, current networks remain optimally designed for non-MTC devices.

For example, current networks subject MTC devices to rather elaborate procedures for sending and receiving application data. The procedures, while robust for handling non-MTC device use scenarios, require a significant amount of control signalling and header information to accompany the application data. This extensive control signalling and header information jeopardizes the ability of wireless networks to consistently offer sufficient capacity for both MTC devices and non-MTC devices.

SUMMARY

Embodiments herein advantageously reduce the amount of control signalling and header information that must accompany application data when transporting that data between an MTC device and a supporting MTC server via a wireless communication network. To do so, the embodiments exploit the relatively small data payloads typical of MTC devices and transport application layer messages within a single radio block, without establishing a temporary block flow (TBF). In this regard, the embodiments also incidentally extend to non-MTC devices with small data payloads.

More particularly, in one or more embodiments, a wireless device (which may be an MTC device or a non-MTC device) sends an application layer message to an application server via an intermediate node. The intermediate node controls the allocation of radio resources to the wireless device, for the transmission of that application layer message. Data transmission on an allocated radio resource occurs in predefined transmission units. The smallest possible transmission unit is referred to herein as a radio block. In some embodiments, for example, an allocated radio resource includes a physical channel defined as a particular time slot in a series of recurring time slots. A radio block in this case may be a data transmission that occurs over a predefined number of consecutive time slots on the physical channel (e.g., four).

Notably, the wireless device herein sends an application layer message to the intermediate node within a single radio block, rather than distributing the message over multiple radio blocks. This advantageously reduces the amount of header information that must accompany the application layer message. Moreover, the wireless device sends that single radio block to the intermediate node without establishing a so-called temporary block flow (TBF). A TBF is a physical connection between the intermediate node and the wireless device whereby particular radio resources are temporarily reserved for that wireless device for the transfer of radio blocks. Refraining from establishing a TBF substantially reduces the amount of control signalling that must accompany the exchange of an application layer message between the intermediate node and the wireless device.

The wireless device specifically includes an intermediate node interface and one or more processing circuits. The intermediate node interface communicatively couples the wireless device to the intermediate node, e.g., via one or more antennas. The one or more processing circuits are configured to prepare a single radio block that includes an application layer message and an indication that the single radio block contains the entire application layer message. The one or more processing circuits are also configured to send a control message to the intermediate node via the intermediate node interface. This control message requests that the intermediate node allocate the wireless device radio resources for sending the single radio block to the intermediate node without establishing a TBF. The one or more processing circuits are finally configured to send, via the intermediate node interface, the single radio block to the intermediate node using radio resources allocated to the device in response to the control message.

Correspondingly, the intermediate node includes a wireless device interface, an application server interface, and one or more processing circuits. The wireless device interface communicatively couples the intermediate node to the wireless device, and the application server interface communicatively couples the intermediate node to the application server. The one or more processing circuits are configured to use these two interfaces for relaying the application layer message to the application server.

More particularly, the one or more processing circuits are configured to receive the control message from the wireless device via the wireless device interface and to allocate radio resources to the wireless device for sending the application layer message in accordance with the control message (i.e., without establishing a TBF). The one or more processing circuits are configured to then transmit an allocation message to the device indicating the allocated radio resources. The one or more processing circuits are configured to thereafter receive a single radio block from the wireless device over the allocated radio resources. Upon receipt, the one or more processing circuits determine, based on an indication within the received single radio block, whether or not the single radio block contains an entire application layer message. If so, the one or more processing circuits forward the application layer message towards the application server via the application server interface.

Various embodiments herein prove particularly advantageous for MTC devices, or more generally for any wireless devices introduced in large quantities and with mostly low priority and low volume application data. These embodiments provide a large range of random identifiers for contention-based access to support a large number of wireless devices. The embodiments also include an indication of the application layer message priority in the control message, so that the intermediate node can allocate radio resources on a priority basis.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
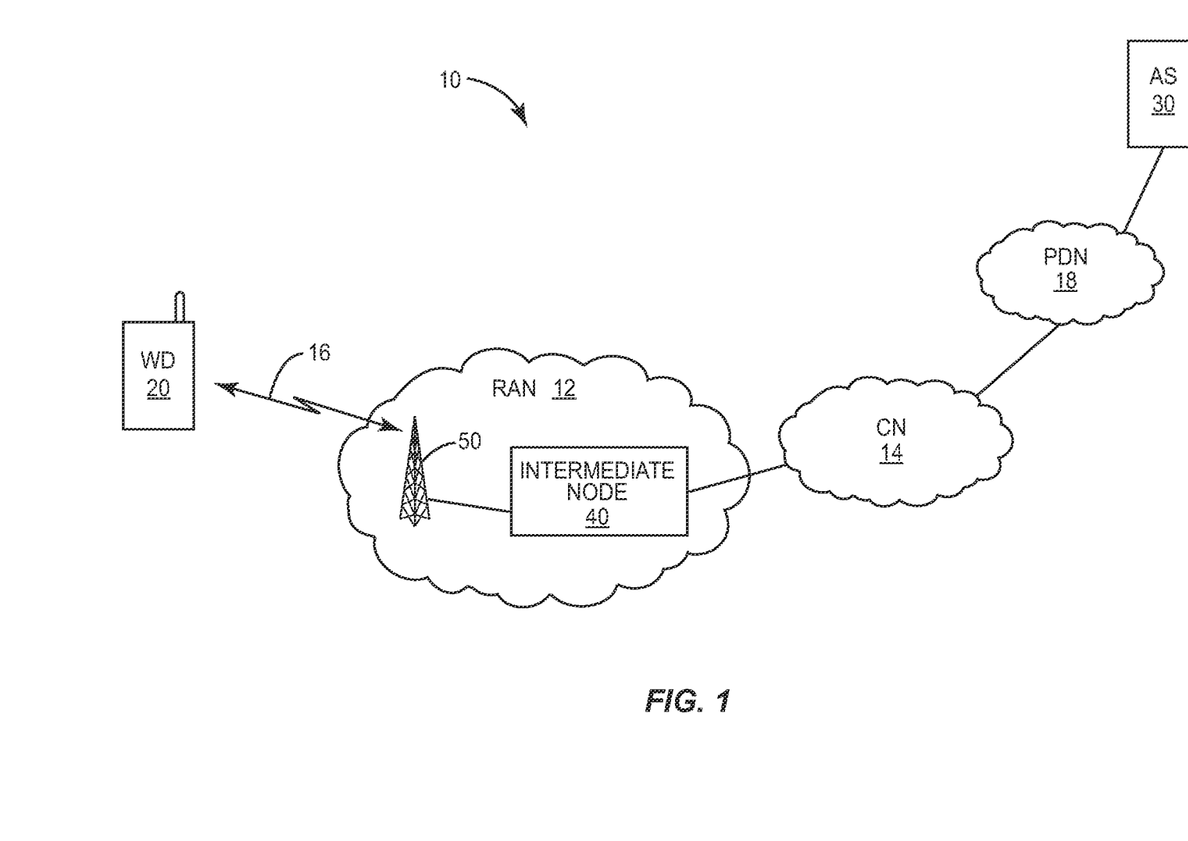
FIG. 1 is a block diagram of a wireless communication network that supports transmission of application layer messages between a wireless device and an application server via an intermediate node, according to one or more embodiments.

FIG. 1 illustrates a wireless communication network 10 that facilitates communication between a wireless device (WD) 20 and an application server (AS) 30. Such communication more specifically entails sending messages between an application at the wireless device 20 and the AS 30, at a relatively high protocol layer. This protocol layer is referred to herein as an application layer, with the messages correspondingly being referred to as application layer messages.

To transport application layer messages between the device 20 and server 30, the network 10 includes a radio access network (RAN) 12 and a core network (CN) 14. The RAN 12 provides the wireless device 20 with access to the CN 14 over radio resources 16. The CN 14 correspondingly connects the RAN 12 to the AS 30, e.g., via an external packet data network (PDN) 18 such as the Internet.

An intermediate node 40 within the RAN 12 controls the allocation of radio resources 16 to the wireless device 20. In some embodiments, the intermediate node 40 actually includes radio circuitry (e.g., a transceiver) used for communicating with the wireless device 20 over the radio resources 16. However, at least as shown, the intermediate node 40 simply controls a separate node 50 that actually includes the radio circuitry.

Regardless, data transmission on an allocated radio resource occurs in predefined transmission units. The smallest possible transmission unit is referred to herein as a radio block. In some embodiments, for example, an allocated radio resource includes a physical channel defined as a particular time slot in a series of recurring time slots. A radio block in this case may be a data transmission that occurs over a predefined number of consecutive time slots on the physical channel (e.g., four).

Notably, the wireless device 20 herein may send an entire application layer message to the intermediate node 40 within a single radio block, rather than distributing different parts of the message over multiple radio blocks. This advantageously reduces the amount of header information that must accompany the application layer message. Moreover, the wireless device 20 may send that single radio block to the intermediate node 40 without establishing a so-called temporary block flow (TBF). A TBF is a physical connection between the intermediate node 40 and the wireless device 20 whereby particular radio resources are temporarily reserved for that wireless device 20 for the transfer of radio blocks. Refraining from establishing a TBF substantially reduces the amount of control signalling that must accompany the exchange of an application layer message between the intermediate node 40 and the wireless device 20.

Figure 2:
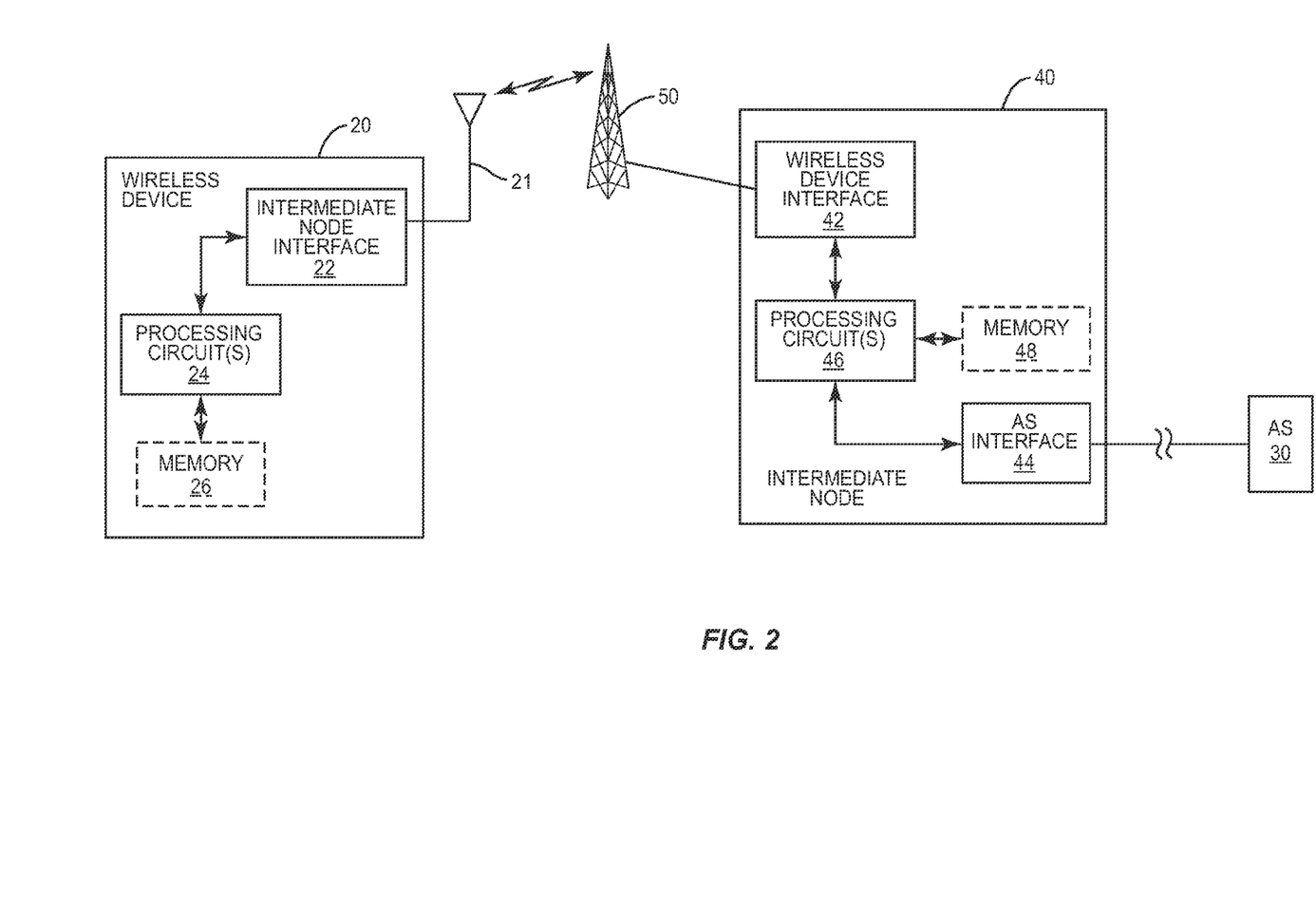
FIG. 2 is a block diagram illustrating details of a wireless device and intermediate node according to one or more embodiments herein.

FIG. 2 illustrates additional details of the wireless device 20 and intermediate node 40 according to one or more embodiments. The wireless device 20, in particular, includes an intermediate node interface 22 and one or more processing circuits 24. The device 20 may also include memory 26 that stores application code executed by the one or more processing circuits 24 for creating an application on the device 20. This application may, for example, generate an application layer message for sending to the application server 30 via the intermediate node 40.

In this regard, the intermediate node interface 22 of the wireless device 20 is configured to communicatively couple the wireless device 20 to the intermediate node 40, e.g., via one or more antennas 21. The intermediate node interface 22 may include, for example, radio circuitry (e.g., a transceiver) for communicating over radio resources 16 allocated to the device 20.

The one or more processing circuits 24 are configured to prepare a single radio block that includes an application layer message and an indication that the single radio block contains the entire application layer message. The one or more processing circuits 24 are also configured to send a control message to the intermediate node 40 via the intermediate node interface 22. This control message requests that the intermediate node 40 allocate the wireless device 20 radio resources 16 for sending the single radio block to the intermediate node 40 without establishing a TBF. That is, the control message requests that the intermediate node 40 allocate only enough radio resources 16 to the wireless device 20 for sending a single radio block, and to therefore not reserve any other radio resources for the device 20, even if those resources would have only been reserved on a temporary basis. The one or more processing circuits 24 are finally configured to send, via the intermediate node interface 22, the single radio block to the intermediate node 40 using radio resources 16 allocated to the device 20 in response to the control message.

Correspondingly, the intermediate node 40 in FIG. 2 includes a wireless device interface 42, an application server interface 44, and one or more processing circuits 46. The wireless device interface 42 is configured to communicatively couple the intermediate node 40 to the wireless device 20. The application server interface 44 is in turn configured to communicatively couple the intermediate node 40 to the application server 30. The one or more processing circuits 46 are configured to use these two interfaces 42, 44 for relaying the application layer message just discussed to the application server 30.

More particularly, the one or more processing circuits 46 are configured to receive the control message from the wireless device 20 via the wireless device interface 42. As noted above, this control message requests that the intermediate node 40 allocate the wireless device 20 radio resources 16 for sending a single radio block to the intermediate node 40 without establishing a TBF. The one or more processing circuits 46 are correspondingly configured to allocate radio resources 16 to the wireless device 20 in accordance with the control message (i.e., without establishing a TBF). Such may entail, for instance, evaluating the availability of radio resources 16 and granting or denying the request based on that availability. If the request is granted, the one or more processing circuits 46 are configured to transmit, via the wireless device interface 42, an allocation message to the device 20 indicating the allocated radio resources 16.

The one or more processing circuits 46 are also configured to receive, via the wireless device interface 42, a single radio block from the wireless device 20 over the allocated radio resources. Upon receipt, the one or more processing circuits 46 determine, based on an indication within the received single radio block, whether or not the single radio block contains an entire application layer message. If so, the one or more processing circuits 46 forward the application layer message towards the application server 30 via the application server interface 44.

If the indication within the received single radio block does not indicate that the single radio block contains an entire application layer message, the one or more processing circuits 46 of course refrain from such forwarding. In some embodiments, for instance, the one or more processing circuits 46 are configured to determine, based on the same indication or another indication within the received single radio block, whether or not the block contains control signalling instead of an application layer message. Control signalling in this regard may include a cell measurement report, a request to pause data transmission, or the like. If the received single radio block contains control signalling, the one or more processing circuits 46 refrain from forwarding that control signalling towards the application server 30. The one or more processing circuits 46 may instead consume the control signalling for mobility management or other purposes.

In at least some embodiments, the single radio block also includes one or more other indications that assist the intermediate node 40 to appropriately forward the included application layer message. As one example, the wireless device 20 includes within the radio block an indication of the length of the application layer message therein. In this case, the intermediate node 40 recognizes or otherwise interprets the indication and uses the length of the application layer message to extract that message from the single radio block. Having extracted the application layer message in this way, the intermediate node 40 forwards it towards the application server 30.

The single radio block may further include one or more other indications that are forwarded to the application server 30 along with the actual application layer message. In some embodiments, for instance, the single radio block also includes an identity of the wireless device 20 that sent the application layer message. If the device 20 only supports execution of a single application, this device identity essentially also identifies the application at the device 10 that generated the application layer message. In some cases, though, the device 20 supports execution of multiple applications. Correspondingly, the single radio block may include not only a device identity but also an identifier of a particular application that generated the application layer message; that is, both a device identity and an application identity.

The above described embodiments prove particularly advantageous in the case that the wireless device 20 is a Machine Type Communication (MTC) device. As an MTC device, the device 20 executes an application (referred to as a machine application) that sends application layer messages to the application server 30 with little or no human intervention. The application layer messages may, for instance, comprise data payloads for smart utility metering, inventory control, remote patient care, etc. Typically, these data payloads are relatively small (e.g., 12 octets or less) and the embodiments exploit this characteristic by transporting each payload (i.e., application layer message) within a single radio block, without establishing a TBF.

Other embodiments herein also prove especially advantageous for MTC devices. Some embodiments, for example, are tailored to support the large number of MTC devices expected to be introduced. Consider embodiments where control messages sent to the intermediate node 40 for requesting radio resource allocation are sent over a random access (i.e., contention-based) channel. In this case, the wireless device 20 generates a random identifier and includes that random identifier in the control message to identify the message (or to at least provide some degree of uniqueness for the message). Upon receiving an allocation message from the intermediate node 40, the wireless device 20 checks whether or not the allocation message references the control message (e.g., by checking whether or not the allocation message references the entire control message, including the random identifier provided therein). If so, the device 20 determines that the intermediate node 40 has allocated radio resources to the wireless device 20 in response to the control message.

Notably, the wireless device 20 in at least one embodiment selects the random identifier from a relatively large range of possible random identifiers. The random identifier may comprise, for instance, a random binary number of at least five bits. Regardless of the particular number of bits, of course, the larger the range of possible random identifiers, the larger the number of wireless devices supported by the network 10. These embodiments thereby support the anticipated introduction of a large number of MTC devices.

As another example, some embodiments are optimized for the lower priority application data typical of most MTC devices. Many MTC devices, for instance, generate application data that, although used for important services, is not time-sensitive. If informed about this, the intermediate node 40 can allocate radio resources accordingly, e.g., by prioritizing allocation of radio resources to other, time-sensitive application data.

Thus, in some embodiments, the wireless device 20 includes in the control message an indication of a priority level of the associated application layer message. The priority level in at least one of these embodiments simply indicates whether or not the application layer message has a low priority level. The indication in this case may be a "1" bit value for indicating that the application layer message has a low priority level and a "0" bit value for indicating that the application layer message does not have a low priority level. Regardless, the intermediate node 40 recognizes or otherwise interprets the indicated priority level. If the application layer message has a low priority level, the intermediate node 40 prioritizes allocation of radio resources 16 to other wireless devices 20 sending control messages that do not indicate a low priority. Otherwise, if the application layer message does not have a low priority level, the intermediate node 40 prioritizes allocation of radio resources 16 to that wireless device 20 above other wireless devices 20 that send a control message indicating a low priority level. Of course, some fairness criterion may be enforced to prevent complete transmission blockage. Also, priority hierarchies more elaborate than simply low priority and not low priority may be indicated.

Embodiments will now be described in the context of an Enhanced General Packet Radio Services (EGPRS) system, to provide a concrete example. EGPRS is a third generation (3G) digital wireless communication technology that provides increased data transmission rates and improved data transmission reliability over the GPRS standard. EGPRS is a digital, packet-switched service available to users of the Global System for Mobile Communications (GSM) wireless standard.

In EGPRS, the CN 14 includes a serving GPRS support node (SGSN) and a gateway GPRS support node (GGSN). The SGSN performs session management and GPRS mobility management, such as handovers and paging. The GGSN provides a gateway between the CN 14 and the PDN 18, and may also implement authentication and location management functions. Also in EGPRS, the intermediate node 40 comprises a Base Station Controller (BSC).

Figure 3:
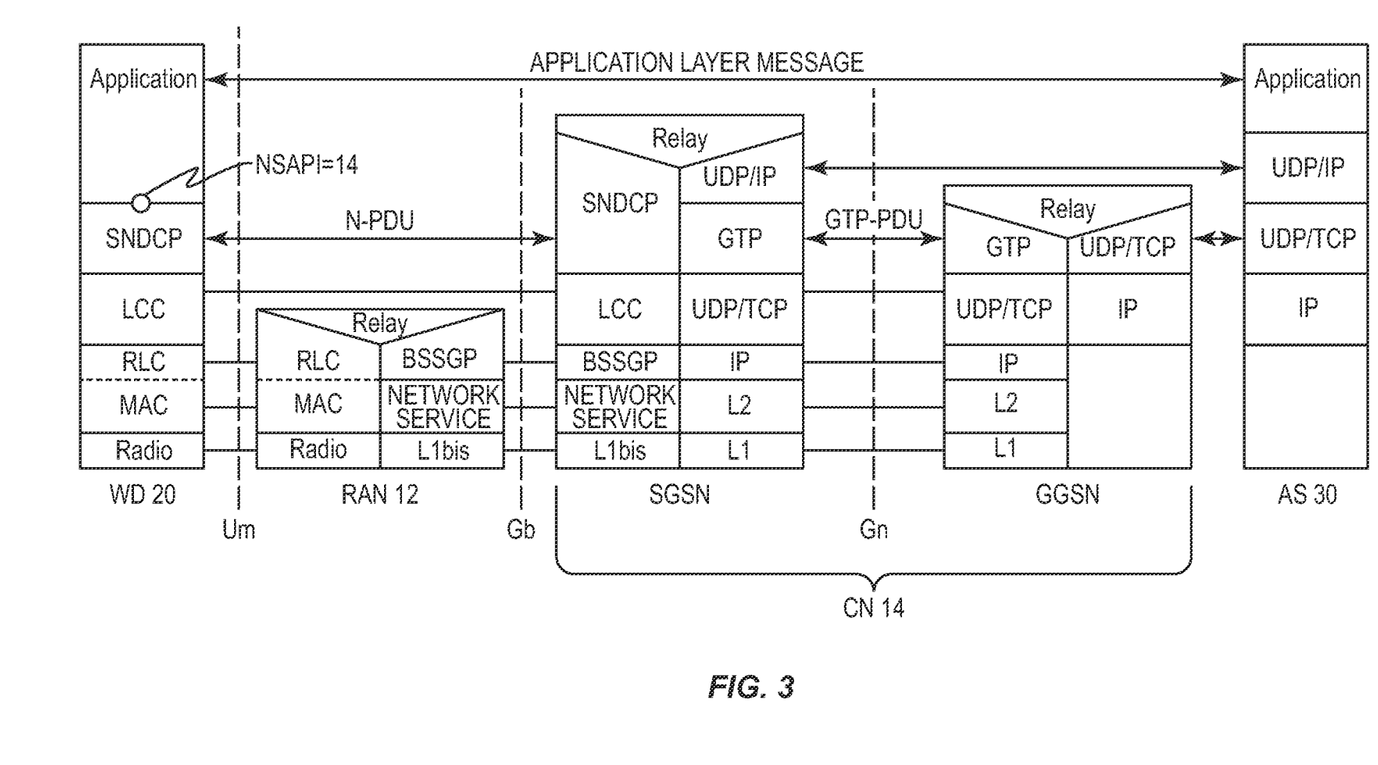
FIG. 3 illustrates exemplary protocol stacks for a wireless device and an intermediate node according to one or more Enhanced General Packet Radio Services (EGPRS) embodiments herein.

FIG. 3 depicts example protocol stacks for these embodiments. In relevant part, the wireless device 20 communicates with the application server 30 at the highest protocol layer, the application layer. The wireless device 20 communicates with the CN 14 (i.e., the SGSN) at the Logical Link Control (LLC) layer, which provides a logical connection between the device 20 and the CN 14. Finally, the wireless device 20 communicates with the RAN 12 (i.e., the intermediate node 40) at the radio layer.

At the radio layer in EGPRS, a given frequency band is divided in the time domain into a succession of frames referred to as TDMA (Time Division Multiplexed Access) frames. Each TDMA frame is in turn divided into a number (e.g., eight) of consecutive time slots of equal duration. With this structure, a physical channel comprises a given time slot in each of a succession of TDMA frames. A series of four consecutive time slots on a physical channel is referred to as a radio block, where the time slots are consecutive in the sense that they are included in four different, but consecutive, TDMA frames.

In between the radio layer and the LLC layer are the Radio Link Control (RLC) layer and the Medium Access Control (MAC) layer. The RLC layer establishes a reliable link (e.g. if required by the QoS of the corresponding packet switched service) between the RAN 12 and wireless device 20. The RLC layer performs segmentation and reassembly of LLC protocol data units (PDUs) into RLC data blocks. The MAC layer encapsulates those RLC blocks with MAC headers. In doing so, the MAC layer controls access signaling across the air interface, including the assignment of uplink and downlink radio blocks which are used to carry the RLC data blocks. The data is then transmitted over the air interface via the radio layer.

A TBF in this context is a physical connection that supports the unidirectional transfer of LLC PDUs on one or more physical channels (e.g., Packet Data Channels, PDCHs). A TBF is temporary and is maintained only for the duration of the data transfer (i.e., until there are no more RLC/MAC blocks to be transmitted).

Figure 4:
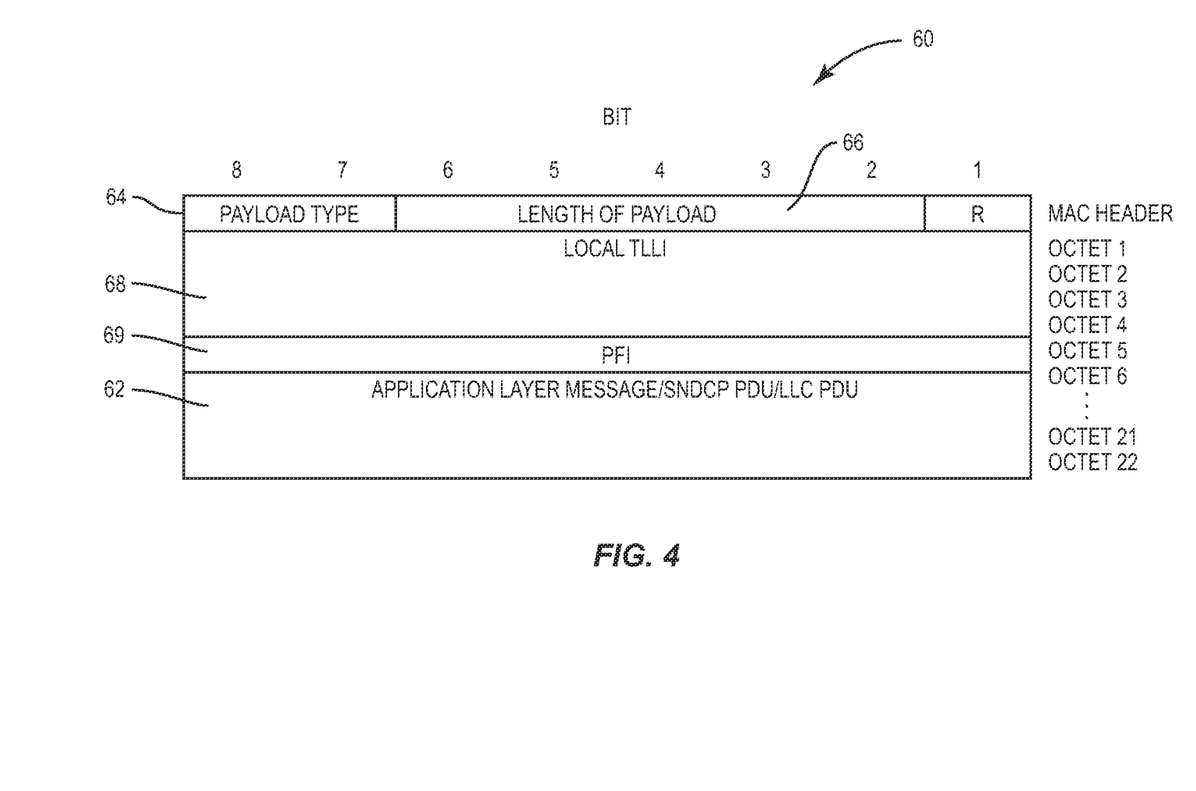
FIG. 4 is a block diagram of a single radio block, in terms of a single RLC/MAC block, according to one or more EGPRS embodiments.

FIG. 4 illustrates an EPGRS example of how the wireless device 20 prepares a single radio block as described above; that is, to include an application layer message and an indication that the single radio block contains the entire application layer message. For ease of illustration, FIG. 4 more particularly depicts a single RLC/MAC block. Because a single radio block carries a single RLC/MAC block in EGPRS, this representation accurately shows the more relevant portions of a single radio block herein.

The single RLC/MAC block 60 in FIG. 4, as prepared by the wireless device 20, includes an entire application layer message 62 in octets 6 through 22. This message 62 is encapsulated by protocol-specific header information, including 4 octets of header information for SNDCP and 6 octets of header information for LLC (see also FIG. 3). Thus, the actual application layer message generated by the application comprises 7 octets.

The RLC/MAC block 60 also includes a payload type 64 within bits 8 and 7 of the MAC header, which are dedicated to indicating whether or not the RLC/MAC block 60 contains an entire application layer message. In this regard, a predetermined value for the payload type 64 indicates that the RLC/MAC block 60 contains an entire application layer message. In some embodiments, for example, the bit value "10" for bits 8 and 7, respectively, indicates that the RLC/MAC block 60 contains an entire application layer message (i.e., an LLC PDU). In this case, the intermediate node 40 would forward the LLC PDU to the SGSN just as it would have done had the LLC PDU been received within the context of a TBF. Other bit values may be reserved for different purposes. In some cases, the bit value "00" indicates that the RLC/MAC block 60 contains an RLC data block. Similarly, the bit value "01" indicates that the RLC/MAC block 60 contains an RLC/MAC control block.

As suggested above, the RLC/MAC block 60 may further include a field 66 within bits 2-6 that indicates the length of the application layer message. More particularly, field 66 indicates the length of the LLC PDU carried within the RLC/MAC block 60. With this indication, the intermediate node 40 may extract the SNDCP PDU from the information field of the LLC PDU and then extract the application layer message from the data segment field of the SNDCP PDU. Having extracted the application layer message in this way, the intermediate node 40 forwards it towards the application server 30.

Finally, the RLC/MAC block 60 may include fields 68 and 69 that effectively serve as a device identity and an application identity, respectively. Specifically, the RLC/MAC block 60 includes a local temporary logical link identifier (TLLI) within octets 1-4. The Local TLLI uniquely defines the logical link between the wireless device 20 and the SGSN, and is thus used by the wireless device 20 to uniquely identify itself in the network 10 (at least locally within the current routing area). Note that if a TBF had been established, the wireless device 20 could have used a so-called Temporary Flow Identifier (TFI) to identify the device 20 and its associated TBF within the set of radio blocks sent from the wireless device 20 to the intermediate node 40 as needed to convey the entire application layer message. However, because no TBF is established in these embodiments, the device 20 is not assigned and therefore cannot use such a TFI. Instead, the device 20 uses the Local TLLI described above.

The RLC/MAC block 60 also includes a Packet Flow Indicator (PFI) within octet 5. The PFI is a value associated with the application that generated the application layer message. The value is unique within the context of the wireless device 20, and is available when the device 20 prepares the single radio block because it is established during PDP (Packet Data Protocol) Context Activation. Both the Local TLLI and the PFI may be forwarded towards the intermediate node 40 along with the application layer message.

Having prepared the single radio block (i.e., the RLC/MAC block 60) in this way, the wireless device 20 sends a control message to the intermediate node 40 that requests the node 40 allocate radio resources for sending the prepared block. In EPGRS embodiments, this control message comprises an EGPRS Packet Channel Request message with a particular establishment cause (also referred to as a particular code point for an establishment cause). An establishment cause generally indicates to the intermediate node 40 the reason for the packet channel access request, whether it be for an emergency call, for performing a location update, for answering a page, etc. According to embodiments herein, therefore, the wireless device 20 indicates to the intermediate node 40 that the reason for the packet channel access request is for sending a single radio block, without establishment of a TBF. FIGS. 5A-5F illustrate various ways to implement this establishment cause code point.

Figure 5A:
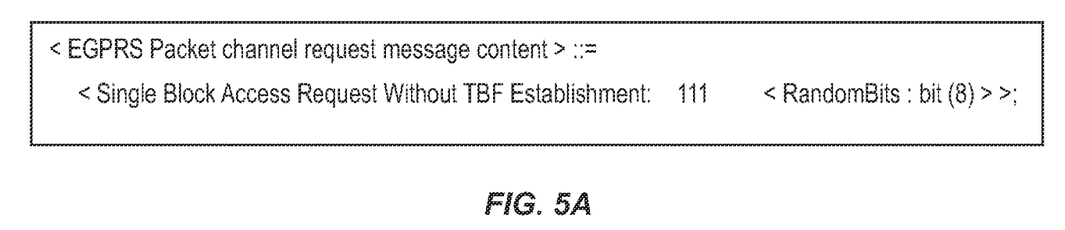
FIGS. 5A-5F are block diagrams of an EGPRS Packet Channel Request according to one or more EGPRS embodiments.

In FIGS. 5A-5F, the establishment cause code point for indicating that the device 20 wishes to send a single radio block without establishing a TBF includes a predetermined number of bits (11 bits as shown), as determined by the size of the EGPRS Packet Channel Request message. The code point in each of these figures is unique from other code-points (not shown) used for indicating other reasons for the packet channel access request. In the embodiments of FIG. 5A, the first 3 bits of the code point includes the bit value '111.' This uniquely indicates that the reason for the request is for single radio block access without TBF establishment. The remaining 8 bits of the code point are reserved for a random identifier. In this regard, the wireless device 20 sends the EGPRS Packet Channel Request over the Packet Random Access Channel (PRACH), which is a contention-based channel. The device 20 randomly selects an 8-bit value for the identifier and sends the EGPRS Packet Channel Request over the PRACH with the 3-bit value '111' concatenated with the 8-bit random identifier as the establishment cause.

Figure 5B:
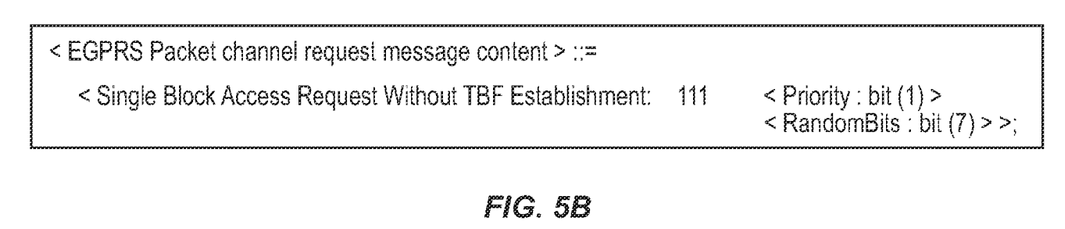
Figure 5C:
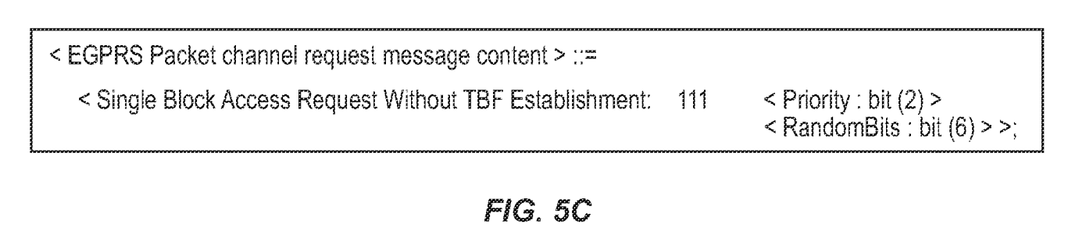

With 8 bits available for the random identifier, the embodiment of FIG. 5A supports contention access for a large number of wireless devices. However, the embodiment does not support a way to distinguish between application layer messages with different priorities. FIG. 5B trades some of the random identifier range for the ability to indicate application layer message priority to the intermediate node 40. Specifically, FIG. 5B includes an establishment cause code point with 7 bits for the random identifier and 1 bit for indicating application layer message priority. In some embodiments, one bit value for the priority bit indicates "low priority" and the other bit value indicates "not low priority." FIG. 5C trades even more of the random identifier range for a more detailed priority hierarchy. In FIG. 5C, the establishment cause code point includes 6 bits for the random identifier and 2 bits for indicating application layer message priority.

Figure 5D:
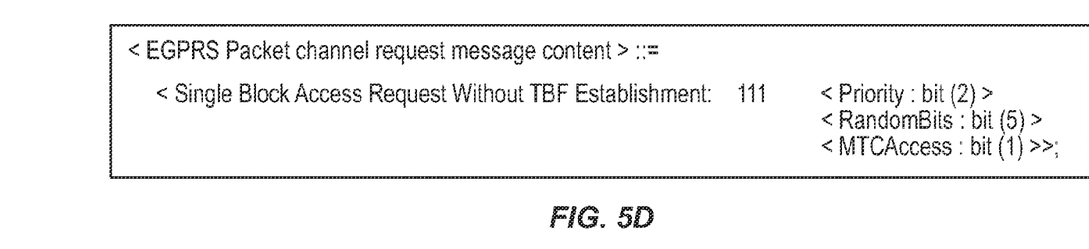
Figure 5E:
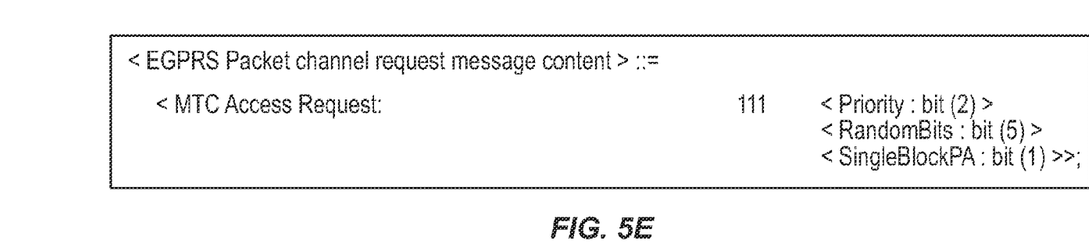
Figure 5F:
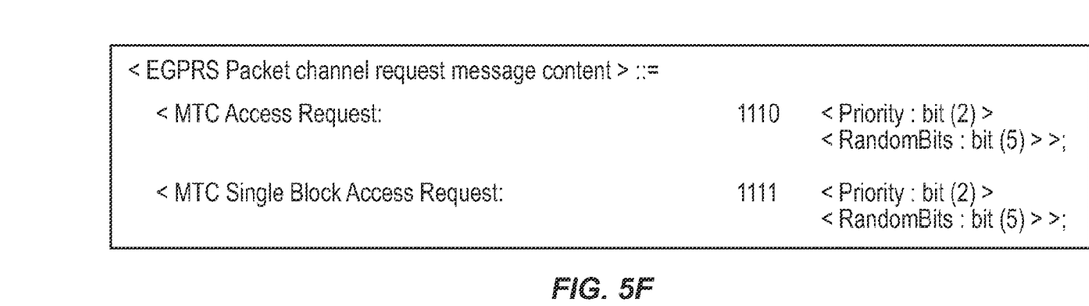

FIGS. 5D-5F illustrate three additional embodiments of the establishment cause code point. The code point in these embodiments additionally indicates to the intermediate node 40 that the wireless device 20 is an MTC device. Informing the intermediate node 40 about this, in conjunction with the priority of the application layer message, enables the intermediate node 40 to optimize the management of radio resources 16 for MTC devices.

Those skilled in the art will of course appreciate that the above embodiments have been described as non-limiting examples, and have been simplified in many respects for ease of illustration. For example, in practice, the network 10 may not acknowledge the reception of a single radio block containing an application layer message. As such, the application layer message may be lost. The lossy nature of application layer message transmission using the above embodiments means that the embodiments are especially advantageous for applications that accept the occasional loss of an application layer message.

Further, the above embodiments have presumed for ease of illustration that application layer messages are encoded using a given coding scheme, and that the coding scheme translates into the embodiments supporting transmission of a given application layer message size. In EGPRS embodiments, for instance, the CS-1 coding scheme supports application layer messages of 7 or 8 octets (depending on whether or not the embodiments include the PFI in the radio block). If other coding schemes are used, the embodiments may support larger application layer messages (e.g., up to 17 or 18 octets if CS-2 is used).

Also, although various embodiments herein were described in the context of EGPRS, no particular communication interface standard is necessary for practicing the present invention. That is, the wireless communication system 10 may be any one of a number of standardized system implementations that support single radio block access without TBF establishment.

Further, although the wireless device 20 herein was referred to in some embodiments as an MTC device, the wireless device may be either an MTC device or a non-MTC device. Indeed, the embodiments herein extend to wireless devices with relatively small data payloads, regardless of how that application data is generated. Thus, the term wireless device is generally intended to include standalone wireless devices, such as cellphones and wireless-equipped personal digital assistants, as well as wireless cards or modules that are designed for attachment to or insertion into another electronic device, such as a personal computer, electrical meter, etc.

Figure 6:
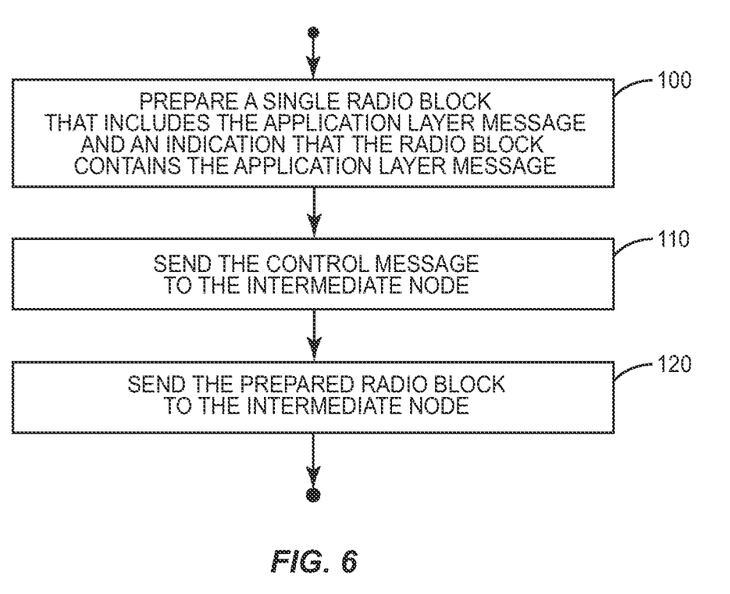
FIG. 6 is a logic flow diagram of a method implemented by a wireless device for sending application layer messages to an application server via an intermediate node according to one or more embodiments.

With the above described modifications and variations in mind, those skilled in the art will understand that a wireless device 20 herein generally performs the processing illustrated in FIG. 6, for sending an application layer message to the application server 30 via the intermediate node 40. The processing includes preparing a single radio block that includes the application layer message and an indication that the single radio block contains the entire application layer message (Block 100). Processing further includes sending a control message to the intermediate node 40 (Block 110). This control message requests that the intermediate node 40 allocate the wireless device 20 radio resources 16 for sending the single radio block to the intermediate node 40 without establishing a TBF. Processing finally includes sending the single radio block to the intermediate node 40 using radio resources 16 allocated to the wireless device 20 in response to the control message (i.e., without TBF establishment) (Block 120).

Figure 7:
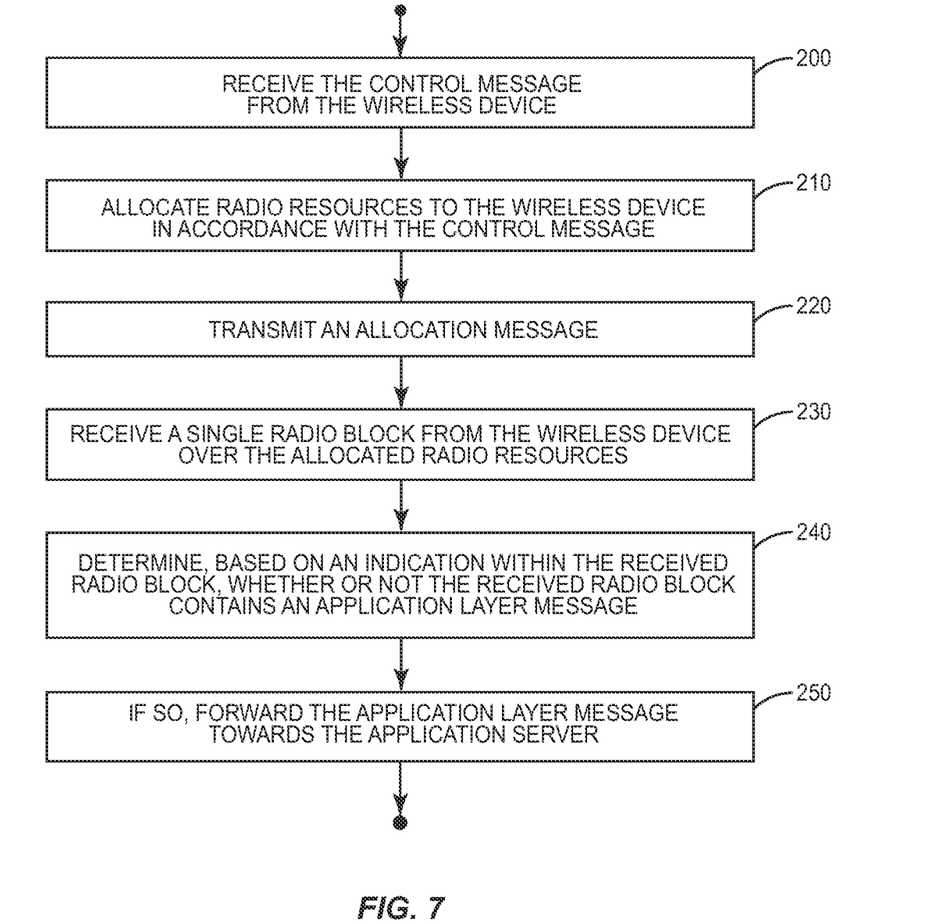
FIG. 7 is a logic flow diagram of a method implemented by an intermediate node for facilitating the sending of application layer messages from a wireless device to an application server via the intermediate node, according to one or more embodiments.

Likewise, those skilled in the art will understanding that an intermediate node 40 herein generally performs the processing illustrated in FIG. 7, for facilitating the sending of an application layer message from the wireless device 20 to the application server 30. The processing includes receiving a control message from the wireless device 20. This control message requests that the intermediate node 40 allocate the wireless device 20 radio resources 16 for sending a single radio block to the intermediate node 40 without establishing a TBF (Block 200). Processing further includes allocating to the wireless device 20 radio resources 16 consisting of a single radio block in accordance with the received control message (Block 210). Processing also includes transmitting an allocation message to the wireless device 20 indicating the allocated radio resources 16 (Block 220).

At some time thereafter, processing further includes receiving a single radio block from the wireless device 20 over the allocated radio resources 16 (Block 230). Having receiving this radio block, the intermediate node 40 determines, based on an indication within the received single radio block, whether or not the single radio block contains an entire application layer message (Block 240). If so, processing includes forwarding that application layer message towards the application server 30 (Block 250).

Those skilled in the art will also appreciate that the various "circuits" described may refer to a combination of analog and digital circuits, and/or one or more processors configured with software stored in memory 26, 48 and/or firmware stored in memory 26, 48 that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, the present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method implemented by a wireless device for sending an application layer message to an application server via an intermediate node, the method comprising:
   preparing a single radio block that includes the application layer message and an indication that the single radio block contains the entire application layer message;
   sending a control message to the intermediate node that requests the intermediate node allocate the wireless device radio resources for sending the single radio block to the intermediate node without establishing a temporary block flow; and
   sending the single radio block to the intermediate node using radio resources allocated to the wireless device in response to the control message.

2. The method of claim 1, further comprising:
   generating a random identifier and including the random identifier in the control message to provide a degree of uniqueness for that control message;
   receiving an allocation message from the intermediate node;
   checking whether or not the received allocation message references the control message, including the random identifier provided therein; and
      if so, determining that the intermediate node has allocated radio resources to the wireless device in response to the control message.

3. The method of claim 2, wherein the random identifier comprises at least five bits.

4. The method of claim 1, further comprising including in the control message an indication of a priority level of the application layer message to be sent to the intermediate node within the single radio block.

5. The method of claim 4, wherein the indication describes whether or not the application layer message to be sent has a low priority level.

6. The method of claim 1, wherein the control message comprises an EGPRS (Enhanced Data Rates for GSM Evolution) Packet Channel Request.

7. The method of claim 1, wherein the application layer message is associated with a machine application hosted by the wireless device, and wherein sending the control message comprises including in the control message an indication that the application layer message is associated with a machine application.

8. The method of claim 1, wherein preparing the single radio block comprises including in the single radio block one or more indications that indicate at least one of:
   an identity of the wireless device;
   an identifier of the particular application at the wireless device that generated the application layer message; and
   the length of the application layer message.

9. The method of claim 1, wherein said indication comprises one or more bits within the single radio block that are dedicated to indicating that the single radio block contains an entire application layer message.

10. A method implemented by an intermediate node disposed between a wireless device and an application server for facilitating the sending of an application layer message from the wireless device to the application server, the method comprising:
    receiving a control message from the wireless device that requests the intermediate node allocate the wireless device radio resources for sending a single radio block to the intermediate node without establishing a temporary block flow;
    allocating to the wireless device radio resources consisting of a single radio block in accordance with the control message;
    transmitting an allocation message to the wireless device indicating the allocated radio resources;
    receiving a single radio block from the wireless device over the allocated radio resources;
    determining, based on an indication within the received single radio block, whether or not the single radio block contains an entire application layer message; and
    if the received single radio block contains an entire application layer message, forwarding that application layer message towards the application server.

11. The method of claim 10, further comprising:
    determining, based on an indication within the received single radio block, whether or not the single radio block contains control signalling instead of an application layer message; and
    if the received single radio block contains control signalling, refraining from forwarding the control signalling towards the application server.

12. The method of claim 10, wherein the control message comprises an EGPRS (Enhanced Data Rates for GSM Evolution) Packet Channel Request.

13. The method of claim 10, further comprising determining, based on an indication within the received single radio block, whether or not the single radio block contains an application layer message that is associated with a machine application.

14. The method of claim 10, further comprising determining, based on one or more indications within the received single radio block, at least one of:
    an identity of the wireless device that sent the application layer message;
    an identifier of the particular application at the wireless device that generated the application layer message; and
    the length of the application layer message.

15. The method of claim 10, further comprising determining the length of the application layer message based on one or more indications within the received single radio block, and wherein forwarding the application layer message towards the application server comprises:
  extracting the application layer message from the single radio block using the length of the application layer message; and
  forwarding the application layer message towards the application server.

16. The method of claim 10, wherein said indication comprises one or more bits within the single radio block that are dedicated to indicating that the single radio block contains an entire application layer message.

17. A wireless device configured to transmit an application layer message to an application server via an intermediate node, the wireless device comprising:
  an intermediate node interface configured to communicatively couple the wireless device to the intermediate node;
  one or more processing circuits configured to:
  prepare a single radio block that includes the application layer message and an indication that the single radio block contains the entire application layer message;
  send, via the intermediate node interface, a control message to the intermediate node that requests the intermediate node allocate the wireless device radio resources for sending the single radio block to the intermediate node without establishing a temporary block flow; and
  send, via the intermediate node interface, the single radio block to the intermediate node using radio resources allocated to the wireless device in response to the control message.

18. The wireless device of claim 17, wherein the one or more processing circuits are further configured to:
  prepare the control message by generating a random identifier and including that random identifier in the control message to provide a degree of uniqueness for that control message;
  receive, via the intermediate node interface, an allocation message from the intermediate node;
  check whether or not the received allocation message references the control message, including the random identifier provided therein; and
  if so, determine that the intermediate node has allocated radio resources to the wireless device in response to the control message.

19. The wireless device of claim 18, wherein the random identifier comprises at least five bits.

20. The wireless device of claim 17, wherein the one or more processing circuits are further configured to prepare the control message by including in the control message an indication of a priority level of the application layer message to be sent to the intermediate node within the single radio block.

21. The wireless device of claim 20, wherein the indication describes whether or not the application layer message to be sent has a low priority level.

22. The wireless device of claim 17, wherein the control message comprises an EGPRS (Enhanced Data Rates for GSM Evolution) Packet Channel Request.

23. The wireless device of claim 17, wherein the application layer message is associated with a machine application hosted by the wireless device, and wherein the one or more processing circuits are further configured to prepare the control message by including in the control message an indication that the application layer message is associated with a machine application.

24. The wireless device of claim 17, wherein the one or more processing circuits are configured to prepare the single radio block to include one or more indications that indicate at least one of:
  an identity of the wireless device;
  an identifier of the particular application at the wireless device that generated the application layer message; and
  the length of the application layer message.

25. The wireless device of claim 17, wherein said indication comprises one or more bits within the single radio block that are dedicated to indicating that the single radio block contains an entire application layer message.

26. An intermediate node disposed between a wireless device and an application server for facilitating the sending of an application layer message from the wireless device to the application server, the intermediate node comprising:
  a wireless device interface configured to communicatively couple the intermediate node to the wireless device;
  an application server interface configured to communicatively couple the intermediate node to the application server; and
  one or more processing circuits configured to:
  receive, via the wireless device interface, a control message from the wireless device that requests the intermediate node allocate the wireless device radio resources for sending a single radio block to the intermediate node without establishing a temporary block flow;
  allocate radio resources to the wireless device in accordance with the control message;
  transmit, via the wireless device interface, an allocation message to the wireless device indicating the allocated radio resources;
  receive, via the wireless device interface, a single radio block from the wireless device over the allocated radio resources;
  determine, based on an indication within the received single radio block, whether or not the single radio block contains an entire application layer message; and
  if the received single radio block contains an entire application layer message, forward that application layer message towards the application server via the application server interface.

27. The intermediate node of claim 26, wherein the one or more processing circuits are further configured to:
  determine, based on an indication within the received single radio block, whether or not the single radio block contains control signalling instead of an application layer message; and
  if the received single radio block contains control signalling, to refrain from forwarding the control signalling towards the application server.

28. The intermediate node of claim 26, wherein the control message comprises an EGPRS (Enhanced Data Rates for GSM Evolution) Packet Channel Request.

29. The intermediate node of claim 26, wherein the one or more processing circuits are configured to determine, based on an indication within the received single radio block, whether or not the single radio block contains an application layer message that is associated with a machine application.

30. The intermediate node of claim 26, wherein the one or more processing circuits are configured to determine, based on one or more indications within the received single radio block, at least one of:
  an identity of the wireless device that sent the application layer message;
  an identifier of the particular application at the wireless device that generated the application layer message; and
  the length of the application layer message.

31. The intermediate node of claim 26, wherein the one or more processing circuits are configured to determine the length of the application layer message based on one or more indications within the received single radio block, and wherein the one or more processing circuits are configured to forward the application layer message towards the application server via the application server interface by:
- extracting the application layer message from the single radio block using the length of the application layer message; and
- forwarding the application layer message towards the application server.

32. The intermediate node of claim 26, wherein said indication comprises one or more bits within the single radio block that are dedicated to indicating that the single radio block contains an entire application layer message.

\* \* \* \* \*